(12) United States Patent
Magami et al.

(10) Patent No.: US 8,186,887 B2
(45) Date of Patent: May 29, 2012

(54) DOUBLE ROW TAPERED ROLLER BEARING UNIT

(75) Inventors: Hidenobu Magami, Fujisawa (JP); Masafumi Fukunaga, Fujisawa (JP); Tadahiro Hoshino, Fujisawa (JP)

(73) Assignee: NSK Ltd., Tokyo (JP)

( * ) Notice: Subject to any disclaimer, the term of this patent is extended or adjusted under 35 U.S.C. 154(b) by 568 days.

(21) Appl. No.: 12/376,228

(22) PCT Filed: Aug. 1, 2007

(86) PCT No.: PCT/JP2007/065076
§ 371 (c)(1),
(2), (4) Date: Feb. 3, 2009

(87) PCT Pub. No.: WO2008/016082
PCT Pub. Date: Feb. 7, 2008

(65) Prior Publication Data
US 2009/0310899 A1    Dec. 17, 2009

(30) Foreign Application Priority Data

Aug. 4, 2006   (JP) .................................. 2006-213500
Oct. 10, 2006  (JP) .................................. 2006-276142
Jan. 26, 2007  (JP) .................................. 2007-016654

(51) Int. Cl.
*F16C 43/04*   (2006.01)
(52) U.S. Cl. ...................... 384/542; 384/562
(58) Field of Classification Search .................. 384/537, 384/540, 542, 461, 447, 562, 559
See application file for complete search history.

(56) References Cited

U.S. PATENT DOCUMENTS

| 1,820,017 | A | * | 8/1931 | Foulks ........................... | 384/562 |
| 1,976,613 | A | * | 10/1934 | Herrmann ...................... | 384/571 |
| 2,082,390 | A | | 6/1937 | Gibbons | |
| 4,732,497 | A | * | 3/1988 | Sawa et al. .................... | 384/585 |
| 5,074,680 | A | * | 12/1991 | Hoch et al. .................... | 384/560 |
| 6,132,098 | A | * | 10/2000 | Zylla ............................. | 384/461 |
| 6,367,980 | B1 | * | 4/2002 | Kobayashi .................... | 384/517 |
| 7,393,141 | B2 | * | 7/2008 | Fahrni et al. .................. | 384/583 |

FOREIGN PATENT DOCUMENTS

DE    1400319 A    10/1968
(Continued)

OTHER PUBLICATIONS

German Office Action issued Jun. 30, 2010 in corresponding German patent application 11-2007-001838.0.

*Primary Examiner* — Michael P Ferguson
(74) *Attorney, Agent, or Firm* — Sughrue Mion, PLLC

(57) ABSTRACT

Both outer-side inner ring elements 14 apply preload to respective tapered rollers 16 by being pressed from both sides in an axial direction by an outwardly-directed, flange-like collar 30, formed on an outer circumferential surface of one end among both ends in the axial direction of an inner-side outer ring member 22, and by a holding ring 31, mounted on the other end of the inner-side outer ring member 22, or by a pair of holding rings 31, mounted on both ends in the axial direction of the inner-side outer ring member 22. A double row tapered roller bearing unit having good assembly precision, being easy to process, and enabling preload control and preload readjustment to be performed with ease is thereby provided.

5 Claims, 13 Drawing Sheets

FOREIGN PATENT DOCUMENTS

| | | |
|---|---|---|
| DE | 3643295 A1 | 6/1988 |
| DE | 3912449 A1 | 10/1990 |
| DE | 19746987 A1 | 5/1999 |
| EP | 0783964 A1 | 7/1997 |
| JP | 1-97534 A | 4/1989 |
| JP | 8-21436 A | 1/1996 |
| JP | 2000-329143 A | 11/2000 |
| JP | 2001-140872 A | 5/2001 |
| JP | 2004-108572 A | 4/2004 |
| JP | 2005-061535 A | 3/2005 |
| JP | 2006-144829 A | 6/2006 |

* cited by examiner

DOUBLE ROW TAPERED ROLLER BEARING UNIT

BACKGROUND

1. Field of the Invention

The present invention relates to a double row tapered roller bearing unit and particularly relates to a double row tapered roller bearing unit applied to a rotation support for rotatably supporting a shaft portion (rotation axis) of a printer cylinder, a rolling mill roller, or other rotating member of any of various industrial machines on a frame or other fixed portion.

2. Related Art

In an offset printer, a plate cylinder, a blanket cylinder, and an impression cylinder are disposed in parallel, and in a printing process, the blanket cylinder contacts outer circumferential surfaces of the plate cylinder and the impression cylinder and transfers and prints printing image, transferred from the plate cylinder, onto a printing sheet passing between the blanket cylinder and the impression cylinder. When a sheet jam occurs due to printing troubles, etc., the three cylinders must be positioned apart from each other, and a jammed sheet is removed upon moving an axial center of the blanket cylinder away from respective axial centers of the plate cylinder and the impression cylinder so that ink on the blanket cylinder does not become transferred onto the printing sheet.

A double row tapered roller bearing unit, having a double structure such as shown in FIGS. 11 and 12, is known as a device for rotatably supporting such a blanket cylinder (see, for example, Patent Document 1). Each of the double row tapered roller bearing units 100 and 100' shown in FIGS. 11 and 12 is constituted of an outer bearing 101 and an inner bearing 102, and an intermediate ring 105, which constitutes inner ring raceway surfaces 103 of the outer bearing 101 and outer ring raceway surfaces 104 of the inner bearing 102, is formed eccentric to the axial center of the blanket cylinder, thereby allowing the above-described operation and high-speed rotation of the blanket cylinder. The outer bearing 101 and the inner bearing 102 are respectively configured in back-to-back combinations to improve bearing stiffness.

In the double row tapered roller bearing unit 100 shown in FIG. 11, the intermediate ring 105 is split in two at a central position in an axial direction into a pair of split rings 105a, 105a. In the double row tapered roller bearing unit 100' shown in FIG. 12, while the intermediate ring 105 has an integrated structure, a cage 108, incorporating an outer ring 106 and tapered rollers 107, is split in two in a circumferential direction to facilitate assembly of the outer bearings 101 as shown in FIG. 13.

Patent Document 1: Japanese Published Unexamined Patent Application JP-A-2004-108572

DISCLOSURE OF THE INVENTION

Problem to be Solved by the Invention

Preload of the blanket cylinder supporting double row tapered roller bearing units 100 and 100' must be restricted to appropriate values by the following reasons. That is, when the double row tapered roller bearing units 100 and 100' are too low in preload and short in rigidity, displacement of a printer cylinder cannot be suppressed and shock streaks and doubling occur, thereby degrading printing quality. On the other hand when the preload is too high, rolling surfaces of the inner and outer ring raceways and the tapered rollers decrease in rolling fatigue life and the double row tapered roller bearing units 100 and 100' become low in durability.

In the double row tapered roller bearing units 100 and 100' shown in FIGS. 11 and 12, because the preload is adjusted by outer ring spacers, a plurality of spacers of different widths must be prepared or spacers must be processed additionally and preload control is thus extremely troublesome.

In the double row tapered roller bearing unit 100 as shown in FIG. 11, because the intermediate ring 105 is split in two, precision of mutually abutting surfaces of the split rings 105a and 105b, 105a is required and processing is thus made complicated. Even with the double row tapered roller bearing unit 100' shown in FIG. 12, because the outer ring 106 and the cage 108 are split in two by cutting after forming into annular forms, processing is complicated and a task of assembling the outer ring 106 onto a frame is also troublesome.

Furthermore, when re-adjustment of the preload becomes necessary due to some reason after mounting of the bearings onto a shaft, a disassembly task in the case of the double row tapered roller bearing unit 100 in FIG. 11 and breakage of the spacers in the case of the double row tapered roller bearing unit 100 in FIG. 12, both of which are extremely difficult tasks, must be performed.

The present invention has been made in view of the above circumstances and an object thereof is to provide a double row tapered roller bearing unit having good assembly precision, being easy to process, and enabling preload control and preload readjustment to be performed with ease.

SUMMARY OF THE INVENTION

The above object of the present invention is achieved by the following configurations.

(1) A double row tapered roller bearing unit having a double structure including:

an outer bearing including:

an integral outer-side outer ring member, having formed on an inner circumferential surface thereof a double row of outer ring raceways each having a partially conical concave surface inclining in a direction such that an inner diameter increases toward an end in an axial direction;

an outer-side inner ring member including a pair of outer-side inner ring elements each having an inner ring raceway of partially conical convex surface formed on an outer circumferential surface, and a plurality of tapered rollers, rollably disposed between both outer ring raceways and both inner ring raceways; and an inner bearing including:

an eccentric integral inner-side outer ring member, having formed on an inner circumferential surface thereof a double row of other outer ring raceways each having a partially conical concave surface inclining in a direction such that an inner diameter increases toward an end in the axial direction, an inner-side inner ring member including a pair of inner-side inner ring elements each having another inner ring raceway of partially conical convex surface formed on an outer circumferential surface, and a plurality of tapered rollers, rollably disposed between both of the other outer ring raceways and both of the other inner ring raceways; and wherein the pair of outer-side inner ring elements are externally fitted onto the inner-side outer ring member in a state where respective ends of smaller outer diameter of both inner ring raceways oppose each other, and both outer-side inner ring elements apply preload to the respective tapered rollers by pressing forces acting from both sides in the axial direction by an outwardly-directed, flange-like collar formed on an outer circumferential surface of one end among both ends in the axial direction of the inner-side outer ring member and by a holding member fitted onto the other end of the inner-side outer ring member, or by a pair of holding members fitted onto respective ends in the axial direction of the inner-side outer ring member.

(2) The double row tapered roller bearing unit according to (1), wherein
the inner-side outer ring member is made of bearing steel and has a screw hole, for screw fixation of the holding member, formed in an end surface in an axial direction thereof, and
the inner-side outer ring member is formed by applying induction hardening to the other outer ring raceway and the outer circumferential surface or by applying immersion quenching and thereafter polishing the screw hole.

(3) The double row tapered roller bearing unit according to (1), wherein
the inner-side outer ring member is made of carburized steel and has a screw hole, for screw fixation of the holding member, formed in an end surface in an axial direction thereof, and
an anti-carburization treatment is applied to the screw hole in the inner-side outer ring member.

(4) The double row tapered roller bearing unit according to (1), wherein
the holding member is a holding nut screwed onto the other end of the inner-side outer ring member and is restricted in fastening amount by an inner ring spacer disposed between the pair of outer-side inner ring elements, and
both outer-side inner ring elements apply preload to the respective tapered rollers by pressing forces acting from both sides in the axial direction by the outwardly-directed, flange-like collar formed on the outer circumferential surface of one end among both ends in the axial direction of the inner-side outer ring member and by the holding nut screwed onto the other end of the inner-side outer ring member.

(5) The double row tapered roller bearing unit according to (1), wherein
the pair of inner-side inner ring elements are externally fittable onto a shaft portion in a state where respective ends of smaller outer diameter of both of the other inner ring raceways oppose each other, and
both inner-side inner ring elements apply preload to the respective tapered rollers of the inner bearing by pressing forces acting from both sides in the axial direction by another outwardly-directed, flange-like collar formed on an outer circumferential surface of one end side in the axial direction of the shaft portion and by a nut member screwed onto the other end side of the shaft portion.

(6) A double row tapered roller bearing unit having a double structure including:
an outer bearing including:
an integral outer-side outer ring member, having formed on an inner circumferential surface thereof a double row of outer ring raceways each having a partially conical concave surface inclining in a direction such that an inner diameter increases toward an end in an axial direction,
an outer-side inner ring member including a pair of outer-side inner ring elements each having an inner ring raceway of partially conical convex surface formed on an outer circumferential surface, and
a plurality of tapered rollers, rollably disposed between both outer ring raceways and both inner ring raceways; and an inner bearing including:
an eccentric integral inner-side outer ring member, having formed on an inner circumferential surface thereof a double row of other outer ring raceways, each having a partially conical concave surface inclining in a direction such that an inner diameter increases toward an end in an axial direction,
an inner-side inner ring member including a pair of inner-side inner ring elements each having another inner ring raceway of partially conical convex surface formed on an outer circumferential surface, and
a plurality of tapered rollers, rollably disposed between both of the other outer ring raceways and both of the other inner ring raceways; and
wherein the pair of outer-side inner ring elements are externally fitted onto the inner-side outer ring member in a state where respective ends of smaller outer diameter of both inner ring raceways oppose each other, the pair of inner-side inner ring elements are externally fitted to a shaft portion in a state where respective ends of smaller outer diameter of both of the other inner ring raceways oppose each other,
both outer-side inner ring elements apply preload to the respective tapered rollers of the outer bearing by pressing forces acting from both sides in the axial direction by an outwardly-directed, flange-like collar formed on an outer circumferential surface of one end among both ends in the axial direction of the inner-side outer ring member and by a holding member fitted onto the other end of the inner-side outer ring member, or by a pair of holding members fitted onto respective ends in the axial direction of the inner-side outer ring member, and
both inner-side inner ring elements apply preload to the respective tapered rollers of the inner bearing by pressing forces acting from both sides in the axial direction by another outwardly-directed, flange-like collar formed on an outer circumferential surface of one end side in the axial direction of the shaft portion and by a nut member screwed onto the other end side of the shaft portion.

Effects of the Invention

According to the double row tapered roller bearing unit of the present invention, the outer-side outer ring member and the inner-side outer ring member are formed as integrated units, the pair of outer-side inner ring elements are externally fitted to the inner-side outer ring member, and both outer-side inner ring elements are made to apply the preload to the respective tapered rollers by the pressing forces acting from both sides in the axial direction by the outwardly-directed, flange-like collar formed on the outer circumferential surface of one end among both ends in the axial direction of the inner-side outer ring member and by the holding member fitted onto the other end of the inner-side outer ring member, or by the pair of holding members fitted onto respective ends in the axial direction of the inner-side outer ring member. Thus, good assembly precision is provided, processing is easy, and preload control can be performed readily.

Further, the pair of inner-side inner ring elements are externally fittable to the shaft portion and both inner-side inner ring elements can be made to apply the preload to the respective tapered rollers of the inner bearing by the pressing forces acting from both sides in the axial direction by the other outwardly-directed, flange-like collar formed on the outer circumferential surface of one end side in the axial direction of the shaft portion and by the nut member screwed onto the other end side of the shaft portion. Thus, the inner bearing is also provided with good assembly precision, is easy to process, and enables preload control to be performed readily. Also, a fitting amount of mutually fitting members can be adjusted by an amount of fastening in a process of screwing the nut member.

Figure 1:
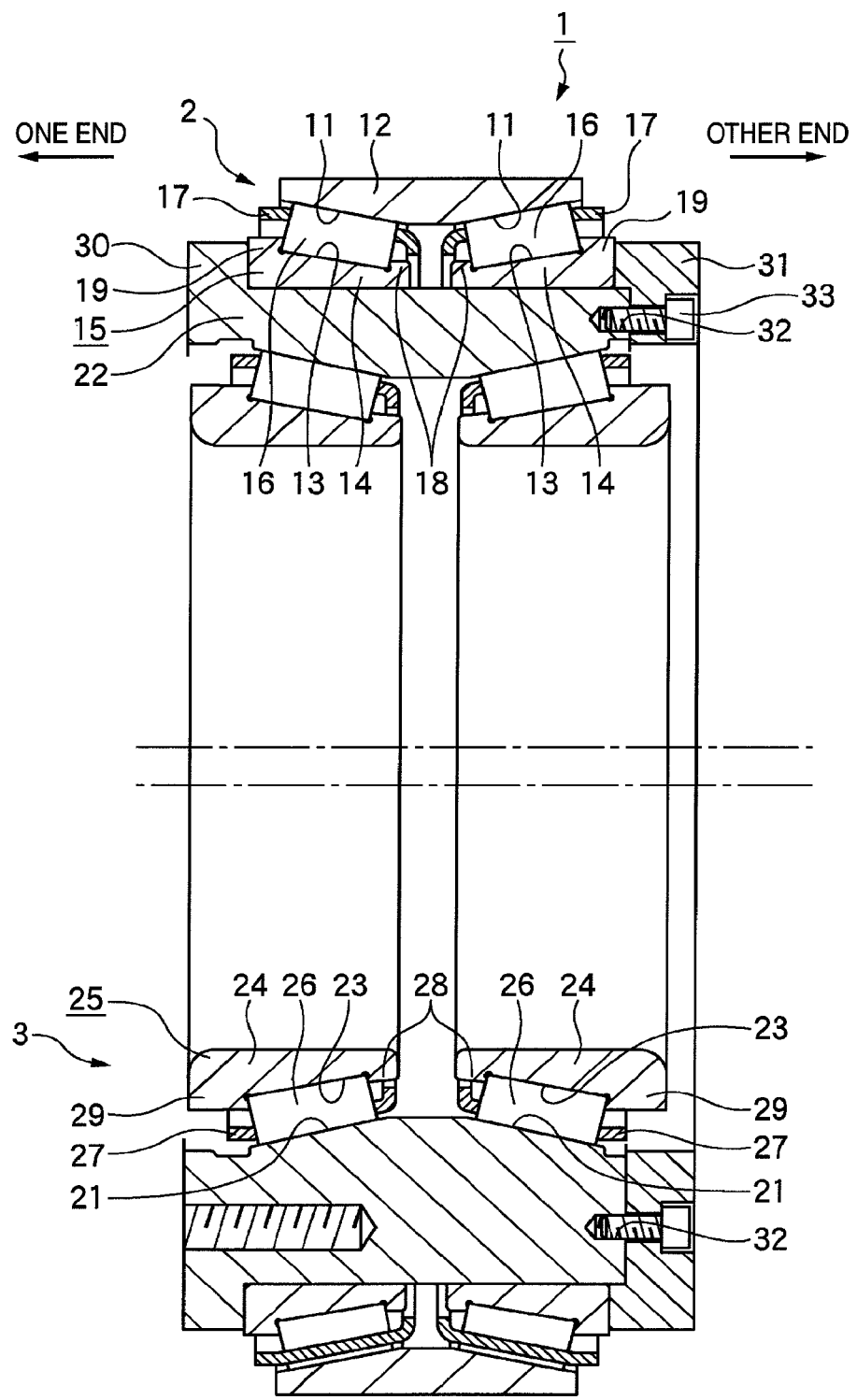
FIG. 1 is a sectional view of a double row tapered roller bearing unit according to a first embodiment of the present invention.

EXPLANATION OF REFERENCE NUMERALS 1, 1*a*, 1*b*, 1*c*, 1*d*, 1*e*, 1*f*, 1*g*, 1*h*, 1*i* double row tapered roller bearing unit
2 outer bearing
3 inner bearing
11 outer ring raceway
12 outer-side outer ring member
13 inner ring raceway
14 outer-side inner ring element
15 outer-side inner ring member
16 tapered roller
21 outer ring raceway
22 inner-side outer ring member
23 other inner ring raceway
24 inner-side inner ring element
25 inner-side inner ring member
26 tapered roller
30 collar
31 holding ring (holding member)
41, 53 inner ring spacer
50 holding nut (holding member)
60 shaft portion
61 other collar
63 nut member

BEST MODES FOR CARRYING OUT THE INVENTION

Double row tapered roller bearing units according to respective embodiments of the present invention shall now be described in detail with reference to the drawings.

First Embodiment

FIG. 1 shows a double row tapered roller bearing unit according to a first embodiment of the present invention. As with the conventional configuration, the double row tapered roller bearing unit 1 rotatably supports a shaft portion of a blanket cylinder or other cylinder of a printer at an inner diameter side of a frame having a cylindrical inner circumferential surface and constitutes a rotation support to which a large radial load and thrust load are applied (which must be made adequately high in rigidity in a radial direction and a thrust direction).

The double row tapered roller bearing unit 1 is configured as having a double structure including an outer bearing 2 and an inner bearing 3 that are respectively configured as back-to-back combinations. The outer bearing 2 includes:

an integral outer-side outer ring member 12, internally fitted onto the not-shown frame and having formed on an inner circumferential surface thereof a double row of outer ring raceways 11, each having a partially conical concave surface inclining in a direction such that an inner diameter increases toward an end in an axial direction; an outer-side inner ring member 15 including a pair of outer-side inner ring elements having inner ring raceways 13 of partially conical convex surface formed on respective outer circumferential surfaces; a plurality of tapered rollers 16 rollably disposed between both outer ring raceways 11 and both inner ring raceways 13; and cages rollably holding the respective tapered rollers 16.

The pair of outer-side inner ring elements 14 are disposed with a gap in between in the axial direction in a state where smaller diameter ends of the respective inner ring raceways 13 oppose each other, and each of the inner ring elements 14 has a smaller diameter side collar 18 formed at an outer circumferential surface at the smaller diameter end and a larger diameter side collar 19 formed at an outer circumferential surface at a larger diameter end in a state of respectively sandwiching the inner ring raceway 13 from both sides.

A lubricating oil flow path for feeding lubricating oil into the double row tapered roller bearing unit 1 may be formed at an intermediate portion in the axial direction of the outer ring member 12 between the double rows of outer ring raceways 11.

The inner bearing 3 includes: an eccentric integral inner-side outer ring member 22, having formed on an inner circumferential surface thereof a double row of other outer ring raceways 21, each having a partially conical concave surface inclining in a direction such that an inner diameter increases toward an end in the axial direction; an inner-side inner ring member 25 which is externally fitted onto the not-shown shaft portion provided in a protruding manner concentrically with the cylinder, including a pair of inner-side inner ring elements 24 having other inner ring raceways 23 of partially conical convex surface formed on respective outer circumferential surfaces; a plurality of tapered rollers 26 rollably disposed between both of the other outer ring raceways 21 and both of the other inner ring raceways 23; and cages 27 rollably holding the respective tapered rollers 26.

The pair of inner-side inner ring elements 24 are also combiningly disposed in a state where smaller diameter ends of the respective other inner ring raceways 23 oppose each other. Each of the inner ring elements 24 has a smaller diameter side collar 28 formed at an outer circumferential surface at the smaller diameter end and a larger diameter side collar 29 formed at an outer circumferential surface at a larger diameter end in a state of respectively sandwiching the other inner ring raceway 23 from both sides. Also as well as the conventional intermediate ring, the inner-side outer ring member 22 is varied in thickness along a circumferential direction and the outer circumferential surface thereof is formed eccentric to an axial center of the shaft portion of the cylinder so as to make an axial center of the shaft portion of the cylinder vary.

The double row tapered roller bearing unit 1 thus supports the rotation of the cylinder by the outer bearing 2 and the inner bearing 3 to enable high speed rotation, and the outer bearing 2 and the inner bearing 3 are respectively configured as back-to-back combinations. Thus, improvement of bearing stiffness can be achieved.

The pair of outer-side inner ring elements 14 are externally fitted onto the inner-side outer ring member 22 in a state where respective ends of smaller outer diameter of both inner ring raceways 13 oppose each other. Also, in order to apply preload to the respective tapered rollers 16 of the outer bearing 2, an outwardly-directed flange-like collar 30 is formed on an outer circumferential surface at one end (left end in FIG. 1) among both ends in the axial direction of the inner-side outer ring member 22. A holding member is fitted onto the other end (right end in FIG. 1). As the holding member in the present embodiment, a holding ring 31, fixed by screwing by a plurality of screws 33 onto the other end surface of the inner-side outer ring member 22 is used. An amount by which the holding ring 31 presses the outer-side inner ring element 14 that is closer to the other end is restricted by the holding ring 31 contacting the other end surface of the inner-side outer ring member 22.

Both outer-side inner ring elements 14 thus apply desired preload (appropriate preload according to usage) to the respective tapered rollers 16 by pressing forces acting in mutually approaching directions from both sides in the axial direction by the outwardly-directed, flange-like collar 30 of the inner-side outer ring member 22 and by the holding ring 31.

The pair of outer-side inner ring elements 14 are externally fitted by clearance fitting onto the inner-side outer ring member 22 and are thereafter fixed by interference fitting by the holding ring 31 being fixed by screwing and the pressing forces thereby acting on the outer-side inner ring elements 14.

Because when the holding ring 31 is to be used as the holding member, screw holes 32 must be tapped in the axial direction end surface of the inner-side outer ring member 22, cracking due to the tapping must be prevented. Thus when the inner-side outer ring member 22 is made of bearing steel, induction hardening may be applied to the other outer ring raceways 21 and the outer circumferential surface or to portions besides the screw holes 32, or the screw holes 32 may be polished after immersion quenching of the inner-side outer ring member 22. On the other hand, when the inner-side outer ring member 22 is made of carburized steel, an anti-carburization treatment is applied just to the screw holes 32 so that these do not become carburized.

According to the present embodiment, the inner ring elements 14, 14 thus apply the preload to the respective tapered rollers 16 by being pressed from both sides in the axial direction by the outwardly-directed, flange-like collar 30, formed on the outer circumferential surface of one end among both ends in the axial direction of the inner-side outer ring member 22, and by the holding ring (holding member) 31. Thus, the double row tapered roller bearing unit 1 can be improved in assembling properties, ease of preload control, rotation precision as well as improved in ease of processing of the respective components.

In particular, in the double row tapered roller bearing unit 1 according to the present embodiment, in comparison to the conventional double row tapered roller bearing units 100 and 100', the outer-side outer ring member and the inner-side outer ring member (intermediate ring) are integral and do not need to be formed in a split manner and there is no need to form a raceway surface on the outer circumferential surface of the eccentrically formed inner-side outer ring member 22. Thus, excellent assembling properties, ease of preload control, and processing properties are realized.

Second Embodiment

Figure 2:
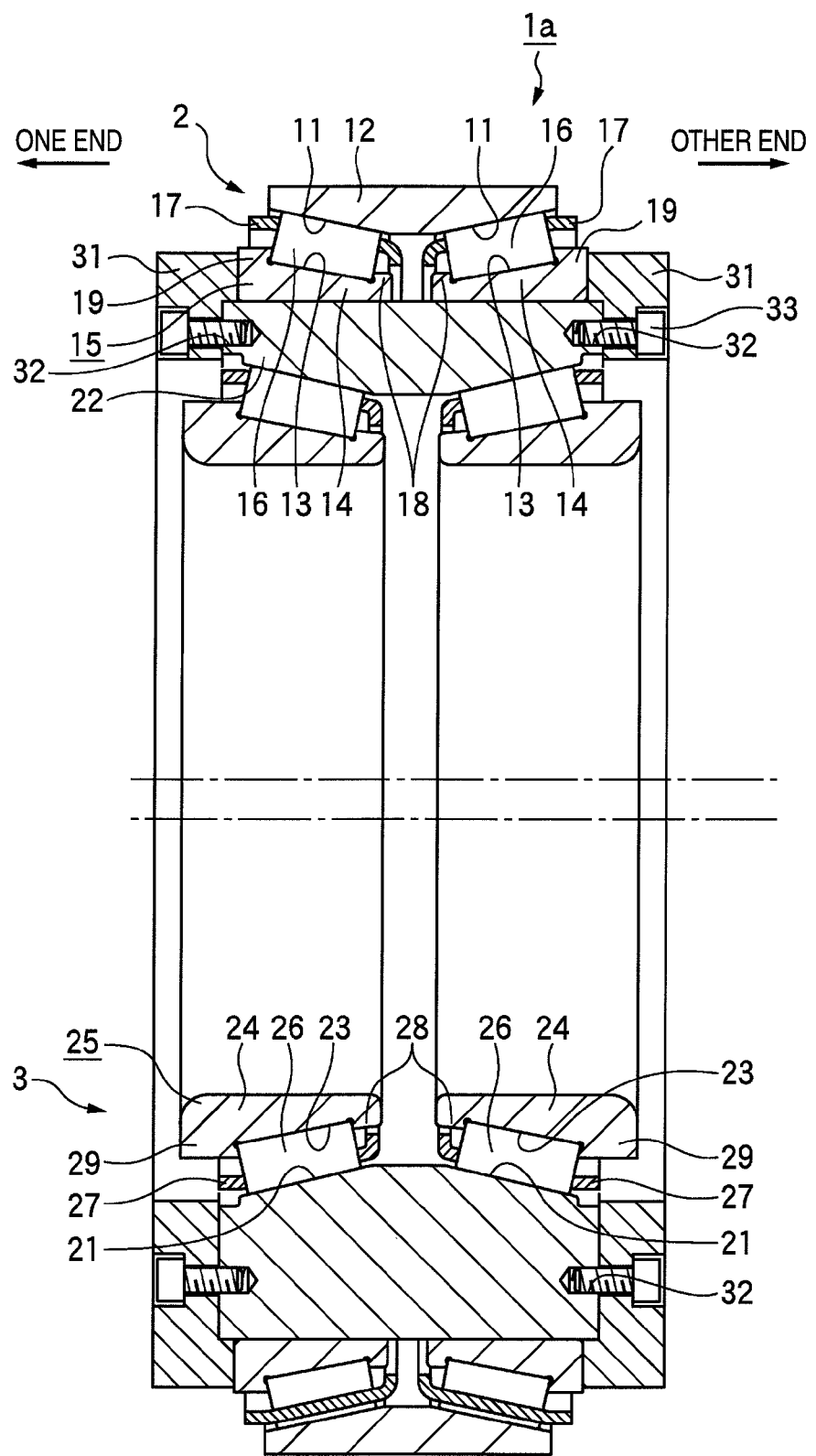
FIG. 2 is a sectional view of a double row tapered roller bearing unit according to a second embodiment of the present invention.

FIG. 2 shows a double row tapered roller bearing unit according to a second embodiment of the present invention. With the double row tapered roller bearing unit 1a according to this embodiment, a pair of holding members (holding rings) 31 are fitted to both ends in the axial direction of the inner-side outer ring member 22 to press both inner ring elements 14 from both sides in the axial direction and thereby apply preload to the respective tapered rollers 16. Because configurations and actions of other portions are the same as those of the first embodiment, portions that are equivalent are provided with the same symbol and redundant description shall be omitted.

With the first and second embodiments, if the preload must be re-adjusted after mounting of the double row tapered roller bearing unit 1 or 1a onto the shaft portion, the adjustment may be performed by insertion of a shim between the holding ring 31 and the outer-side inner ring element 14.

Third Embodiment

Figure 3:
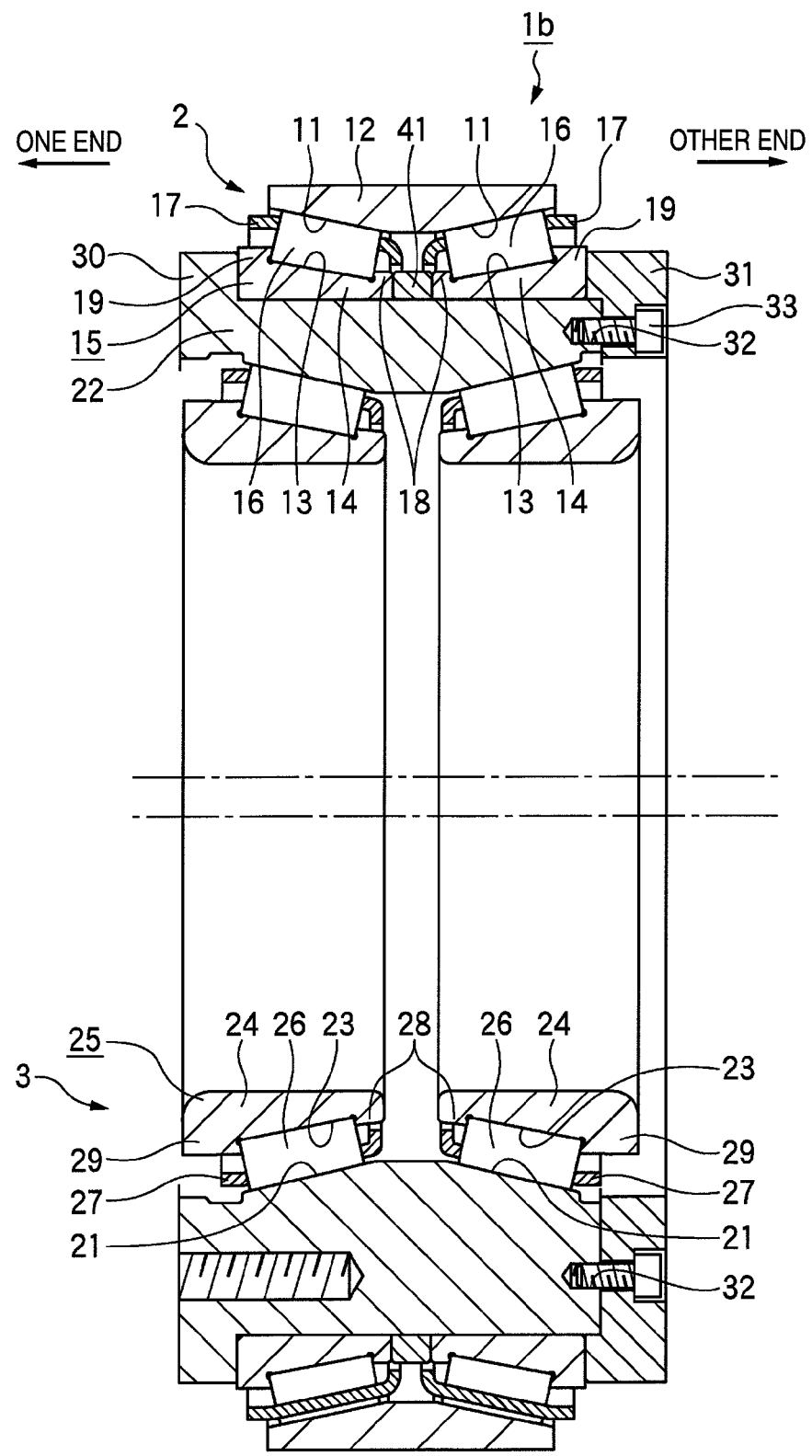
FIG. 3 is a sectional view of a double row tapered roller bearing unit according to a third embodiment of the present invention.

FIG. 3 shows a double row tapered roller bearing unit according to a third embodiment of the present invention. With the double row tapered roller bearing unit 1b according to this embodiment, an inner ring spacer 41 is disposed between the pair of inner ring elements 14.

Thus even if there is deviation among fastening forces of the screws 33 by which the holding ring 31 is fixed by screwing, fixing of the holding ring 31 in an inclined manner can be prevented by the inner ring spacer 41, the desired preload (the appropriate preload according to usage) can be applied to the respective tapered rollers uniformly across the circumferential direction, and precision of rotation can be improved further.

Because configurations and actions of other portions are the same as those of the first embodiment, portions that are equivalent are provided with the same symbol and redundant description shall be omitted.

Fourth Embodiment

Figure 4:
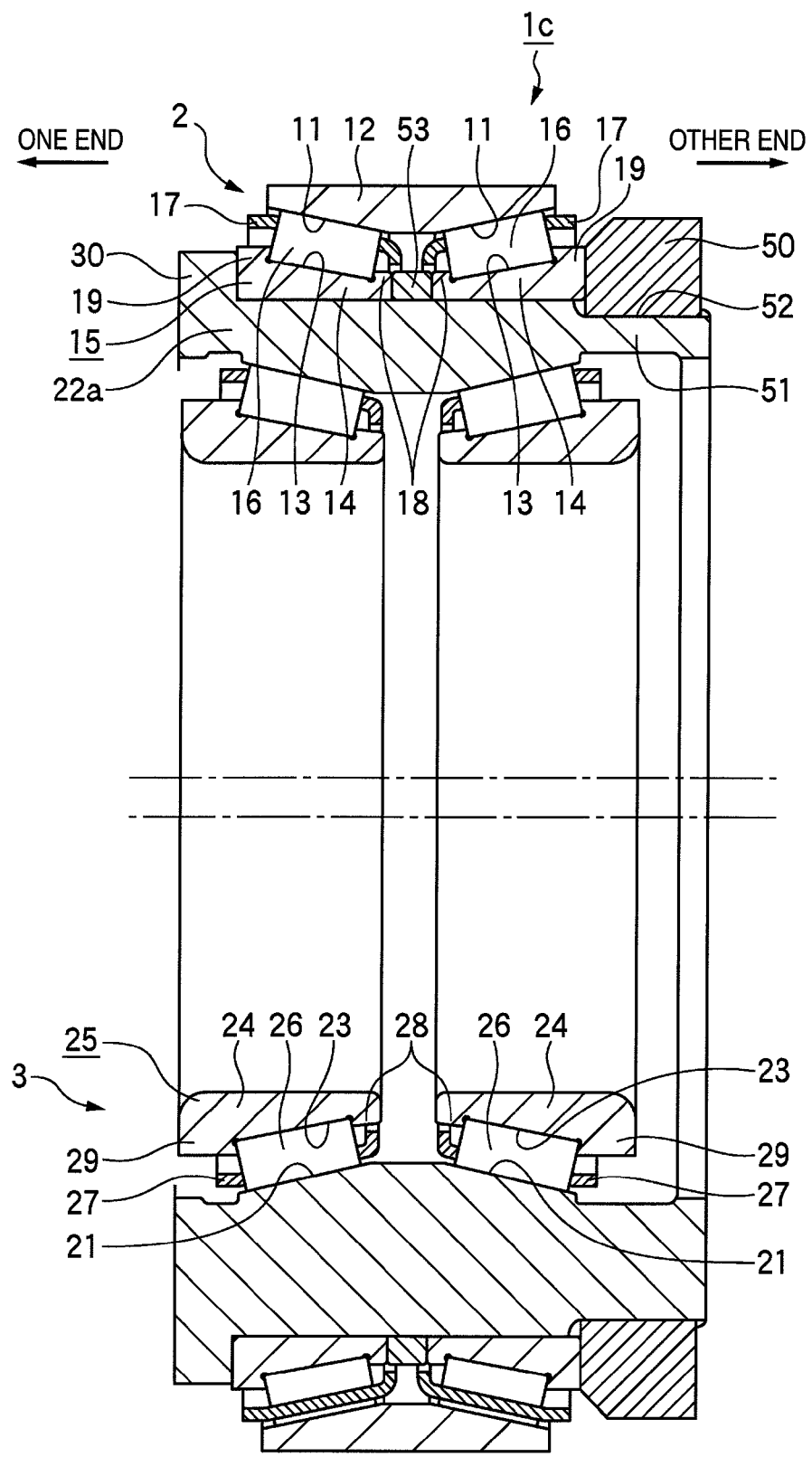
FIG. 4 is a sectional view of a double row tapered roller bearing unit according to a fourth embodiment of the present invention.

FIG. 4 shows a double row tapered roller bearing unit according to a fourth embodiment of the present invention. With the double row tapered roller bearing unit 1c according to this embodiment, a holding nut 50 is used as the holding member. In this case, a thread groove 52 is formed on an outer circumferential surface of an end portion 51 at the other end of an inner-side outer ring member 22a, and the nut 50 is screwed onto the thread groove 52. An inner ring spacer 53 is disposed between the pair of inner ring elements 14 to restrict the fastening amount of the holding nut 50 in a process of screwing the holding nut 50 and enable orientations of the pair of outer-side inner ring elements 14 to be maintained in satisfactory states.

Thus with the present embodiment in which the holding nut 50 is screwed on, the desired preload (the appropriate preload according to usage) can be applied to the respective tapered rollers more uniformly across the circumferential direction in comparison to the first embodiment in which the holding ring 31 is fixed by the bolts 33 and the precision of rotation can be improved further. Also because it suffices to simply screw on the holding nut 50, productivity is improved in comparison to the first embodiment and manufacture can be performed at low cost.

The pair of outer-side inner ring elements 14 are externally fitted onto the inner-side outer ring member 22a by clearance fitting and thereafter fixed by interference fitting by the pressing forces acting on the outer-side inner ring elements 14 by the holding nut 50 being fastened onto the inner-side outer ring member 22a. Furthermore, the outer-side outer ring member 12 that is internally fitted by clearance fitting onto the not-shown frame is also moved radially outward by pressing force acting due to fastening of the holding nut 50 onto the inner-side outer ring member 22a and is thereby fixed by interference fitting.

In particular, although by the holding nut 50 being fastened onto the inner-side outer ring member 22a, the end portion 51 at the other end of the inner-side outer ring member 22a shrinks slightly and tends to push the tapered rollers 26 and the pair of inner-side inner ring elements 24 radially inward, because the pair of inner-side inner ring elements 24 are constrained by the not-shown shaft portion, the forces that tends to press act radially outward and contribute to a fastening force in the process of fixing the outer-side outer ring member 12 onto the frame.

Because configurations and actions of other portions are the same as those of the first embodiment, portions that are equivalent are provided with the same symbol and redundant description shall be omitted.

Figure 5:
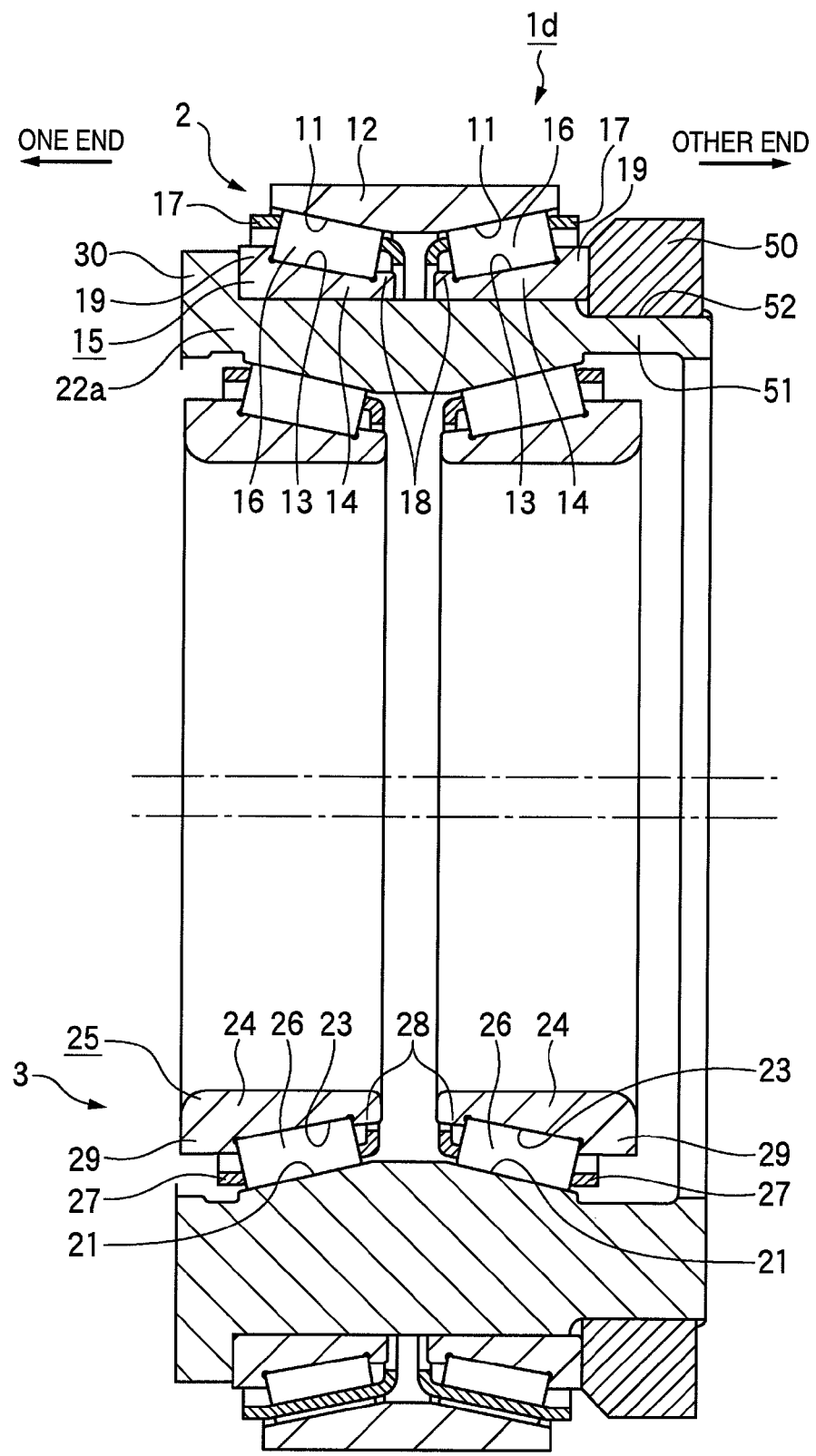
FIG. 5 is a sectional view of a double row tapered roller bearing unit according to a modification example of the fourth embodiment of the present invention.

As a modification example of this embodiment, in a double row tapered roller bearing unit 1d shown in FIG. 5, an inner ring spacer is not disposed between the pair of outer-side inner ring elements 14 in comparison to the double row tapered roller bearing unit 1c. In this case, the fastening amount of the holding nut 50 in the process of screwing the holding nut 50 is determined by measuring a number of rotations of the holding nut 50 or the actual preload amount.

Fifth Embodiment

Figure 6:
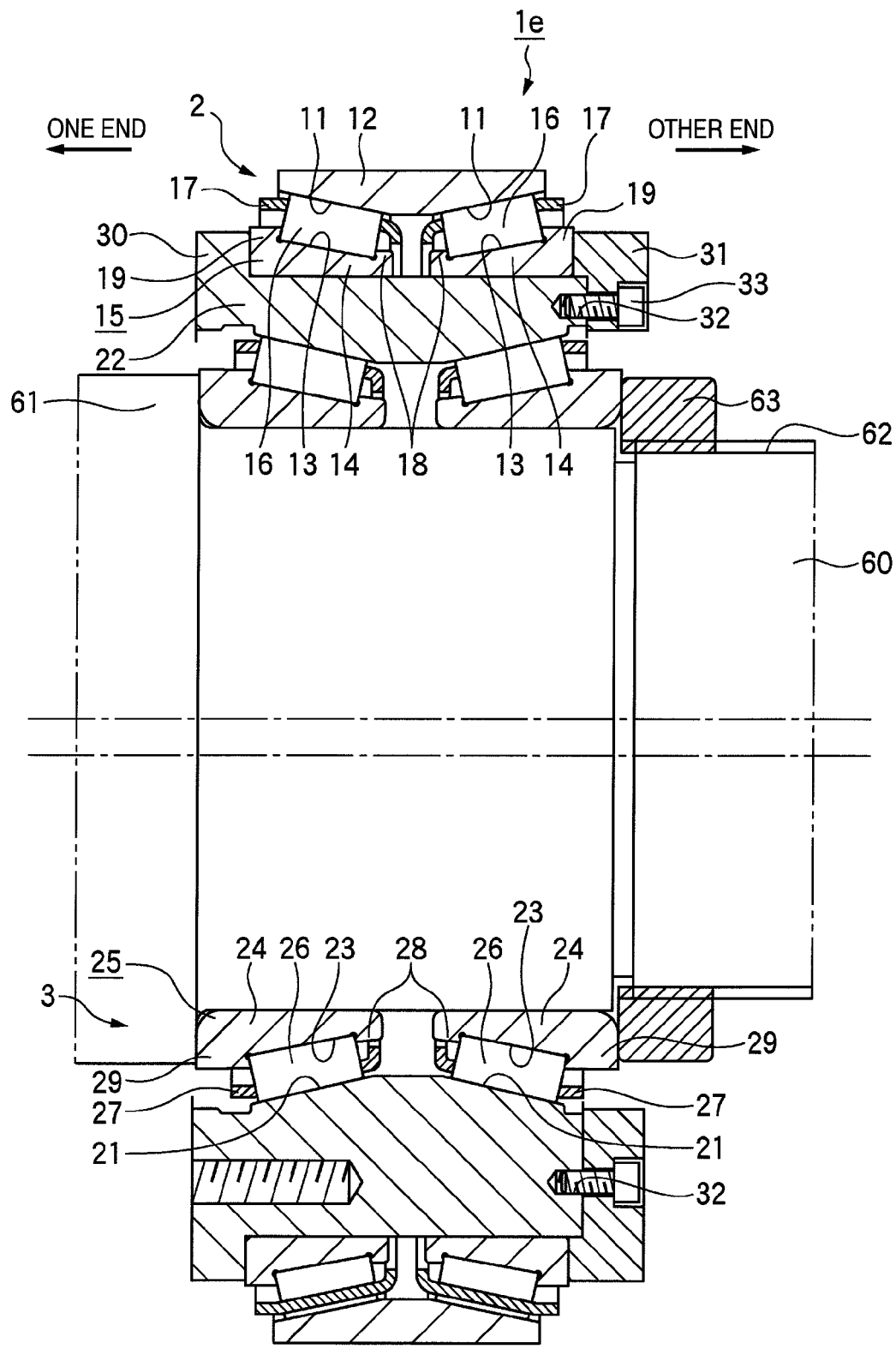
FIG. 6 is a sectional view of a double row tapered roller bearing unit according to a fifth embodiment of the present invention.

FIG. 6 shows a double row tapered roller bearing unit according to a fifth embodiment of the present invention. With the double row tapered roller bearing unit 1e according to this embodiment, preload is applied to the respective tapered rollers 26 of the inner bearing 3 by the double row tapered roller bearing unit 1 according to the first embodiment being mounted on a shaft portion 60.

The pair of inner-side inner ring elements 24 of the inner bearing are externally fitted onto the shaft portion 60 in a state where respective ends of smaller outer diameter of both inner ring raceways 23 oppose each other. Also, in order to apply the preload to the respective tapered rollers 26 of the inner bearing 3, another outwardly-directed flange-like collar 61 is formed on an outer circumferential surface at one end (left end in FIG. 6) in the axial direction of the shaft portion 60. Also, a thread groove 62 is formed at the other end side (right side in FIG. 6) of the shaft portion 60, and a nut member 63 is screwed onto the thread groove 62.

Both inner-side inner ring elements 24 thus apply the desired preload (the appropriate preload according to usage) uniformly across the circumferential direction to the respective tapered rollers 26 by pressing forces acting in mutually approaching directions from both sides in the axial direction by the other outwardly-directed, flange-like collar 61 of the shaft portion 60 and by the nut member 63.

The pair of inner-side inner ring elements 24 are externally fitted onto the shaft portion 60 and are thereafter fixed by interference fitting by pressing forces acting on the inner-side inner ring elements 24 by the nut member 63 being fastened onto the shaft portion 60. Although the pair of inner-side inner ring elements 24 may be externally fitted by clearance fitting onto the shaft portion 60 in advance, in this embodiment, the inner ring elements 24 are externally fitted by interference fitting in advance. Here, by the pair of inner-side inner ring elements 24 approaching each other upon fastening of the nut member 63, the preload is applied to the tapered rollers 26 of the inner bearing 3, and pressing force acts radially outward on the inner-side outer ring member 22 as well. The pressing force acting on the inner-side outer ring member 22 acts radially outward on the pair of outer-side inner ring elements 14, the tapered rollers 16, and the outer-side outer ring member 12 as well. Although clearance is provided between the not-shown frame and the outer-side outer ring member 12 to facilitate its mounting, due to expansion of the outer-side outer ring member 12 by the pressing force due to the fastening of the nut member 63, the outer-side outer ring member 12 is fixed to the frame without clearance so that backlash is suppressed and radial rigidity is improved. Furthermore, when the outer-side outer ring member 12 is constrained by the frame, the force that tends to press adjusts fitting amounts between mutually fitting members, that is, between the outer-side outer ring member 12 and the frame, between the pair of outer-side inner ring elements 14 and the inner-side outer ring member 22, and between the inner-side inner ring elements 24 and the shaft portion 60.

Here because the fitting amounts between the outer-side outer ring member 12 and the frame and between the pair of outer-side inner ring elements 14 and the inner-side outer ring member 22 that are due to the holding ring 31 are determined by abutting positions of the holding ring 31 and the outer-side inner ring element 14 when the holding ring 31 is fixed by screwing to the inner-side outer ring member 22, the adjustment amount thereof is slight. However, by fastening the nut member 63, the fitting amounts between these members can be adjusted adequately according to the fastening amount.

Although the fastening amount of the nut member 63 in the process of screwing the nut member 63 may be determined by measuring a number of rotations of the nut member 63 or the actual preload amount, an inner ring spacer may be disposed between the pair of inner-side inner ring elements 24 to regulate the fastening amount of the nut member 63 and maintain orientations of the pair of inner-side inner ring elements 24 in satisfactory states.

Because in the present embodiment, both outer-side inner ring elements 14 are made to apply the preload to the respective tapered rollers 16 of the outer bearing 2 by being pressed from both sides in the axial direction by the outwardly-directed, flange-like collar 30, formed on the outer circumferential surface of one end among both ends in the axial direction of the inner-side outer ring member 22, and by the holding ring (holding member) 31, fitted onto the other end of the inner-side outer ring member 22, and both inner-side inner ring elements 24 are made to apply the preload to the respective tapered rollers 26 of the inner bearing 3 by the pressing forces acting from both sides in the axial direction due to the other outwardly-directed, flange-like collar 61, formed on the outer circumferential surface of one end in the axial direction of the shaft portion 60, and by the nut member 63, screwed onto the other end of the shaft portion 60, the double row tapered roller bearing unit 1e can be improved in assembling properties, ease of preload control, rotation precision as well as improved in ease of processing of the respective components.

In addition, the fitting amounts between mutually fitted members can be adjusted by the fastening amount in the process of screwing the nut member 63.

Because configurations and actions of other portions are the same as those of the first embodiment, portions that are equivalent are provided with the same symbol and redundant description shall be omitted.

Sixth Embodiment

Figure 7:
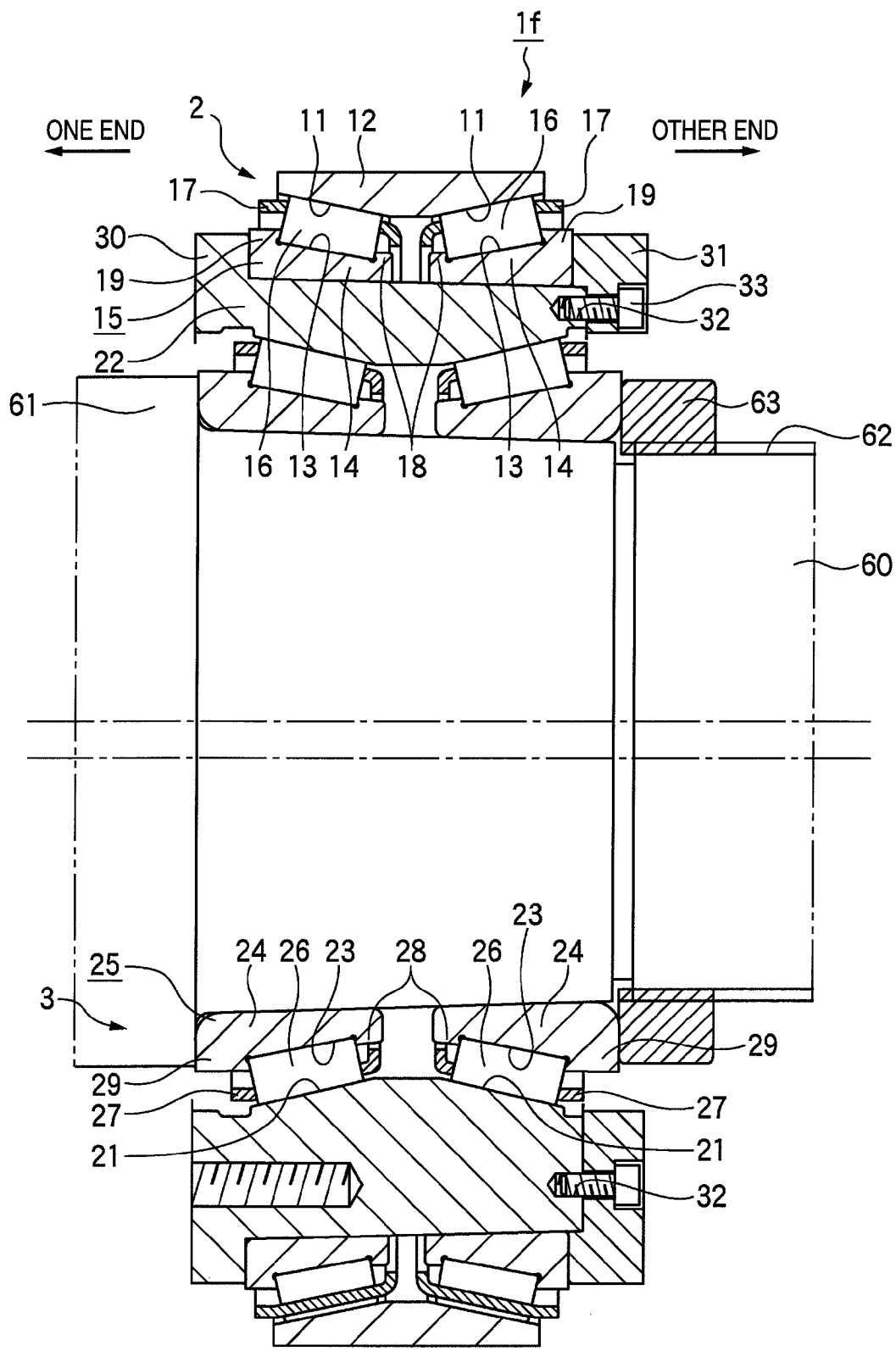
FIG. 7 is a sectional view of a double row tapered roller bearing unit according to a sixth embodiment of the present invention.

FIG. 7 shows a double row tapered roller bearing unit according to a sixth embodiment of the present invention. With the double row tapered roller bearing unit 1f according to this embodiment, respective inner circumferential surfaces of the pair of outer-side inner ring elements 14 and an opposing outer circumferential surface of the inner-side outer ring member 22 are formed to tapered shapes so as to respectively become reduced in diameter from one end (left end in FIG. 7) to the other end (right end in FIG. 7) in the axial direction. Also, the respective inner circumferential surfaces of the pair of inner-side inner ring elements 24 and an opposing outer circumferential surface of the shaft portion 60 are formed to tapered shapes so as to respectively become reduced in diameter from one end to the other end in the axial direction.

Thus by the holding ring 31 being fixed by screwing, the respective inner circumferential surfaces of the pair of outer-side inner ring elements 14 are pressed strongly against the outer circumferential surface of the inner-side outer ring member 22 so that these are fitted to each other without backlash and the radial stiffness can be made large. Likewise, by fastening of the nut member 63, the respective inner circumferential surfaces of the pair of inner-side inner ring elements 24 are pressed strongly against the outer circumferential surface of the shaft portion 60 so that these are fitted to each other without backlash and the radial stiffness can be made large.

Figure 8:
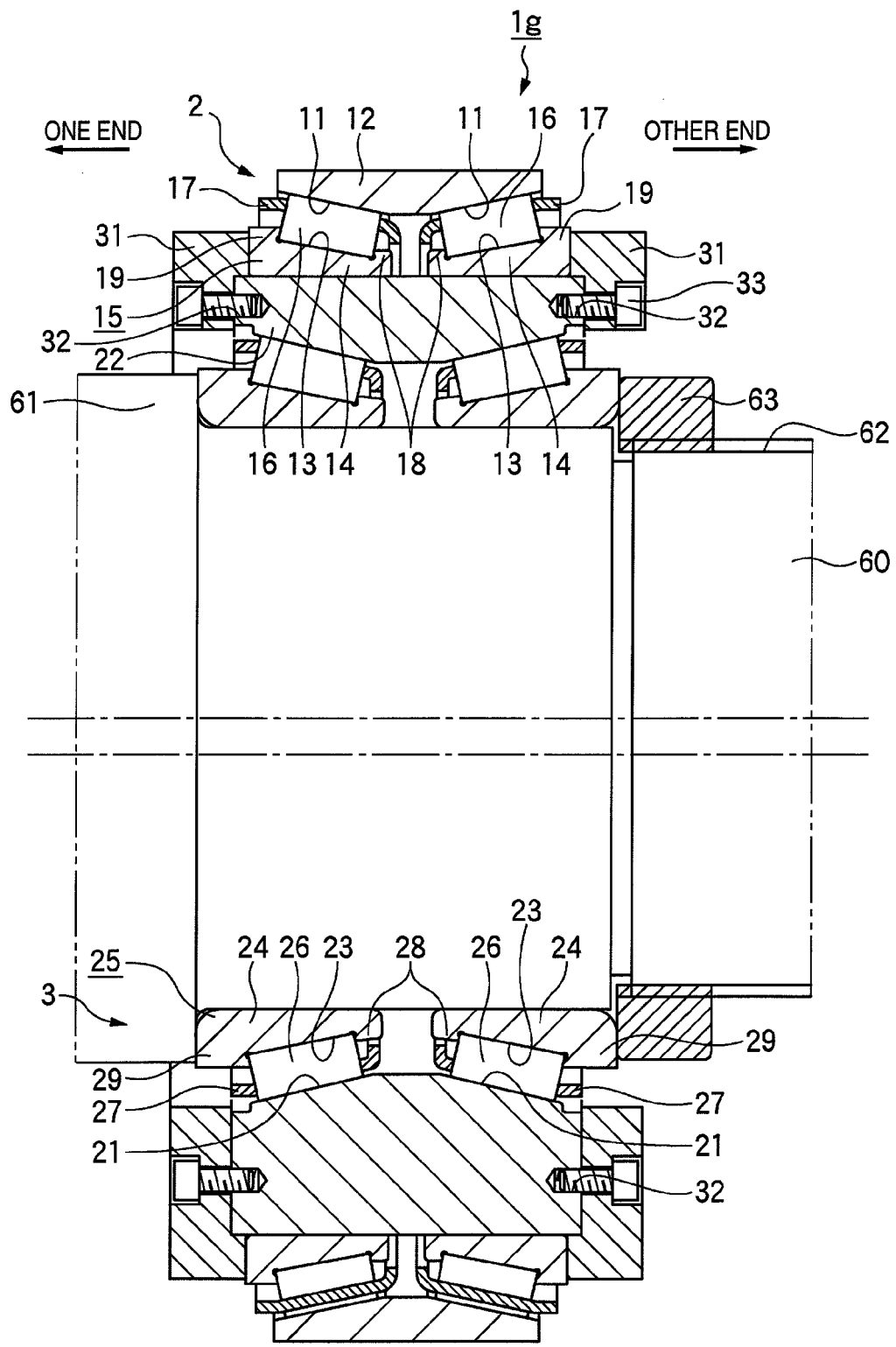
FIG. 8 is a sectional view of a double row tapered roller bearing unit in which a pair of holding rings of the second embodiment are applied to the fifth embodiment of the present invention.
Figure 9:
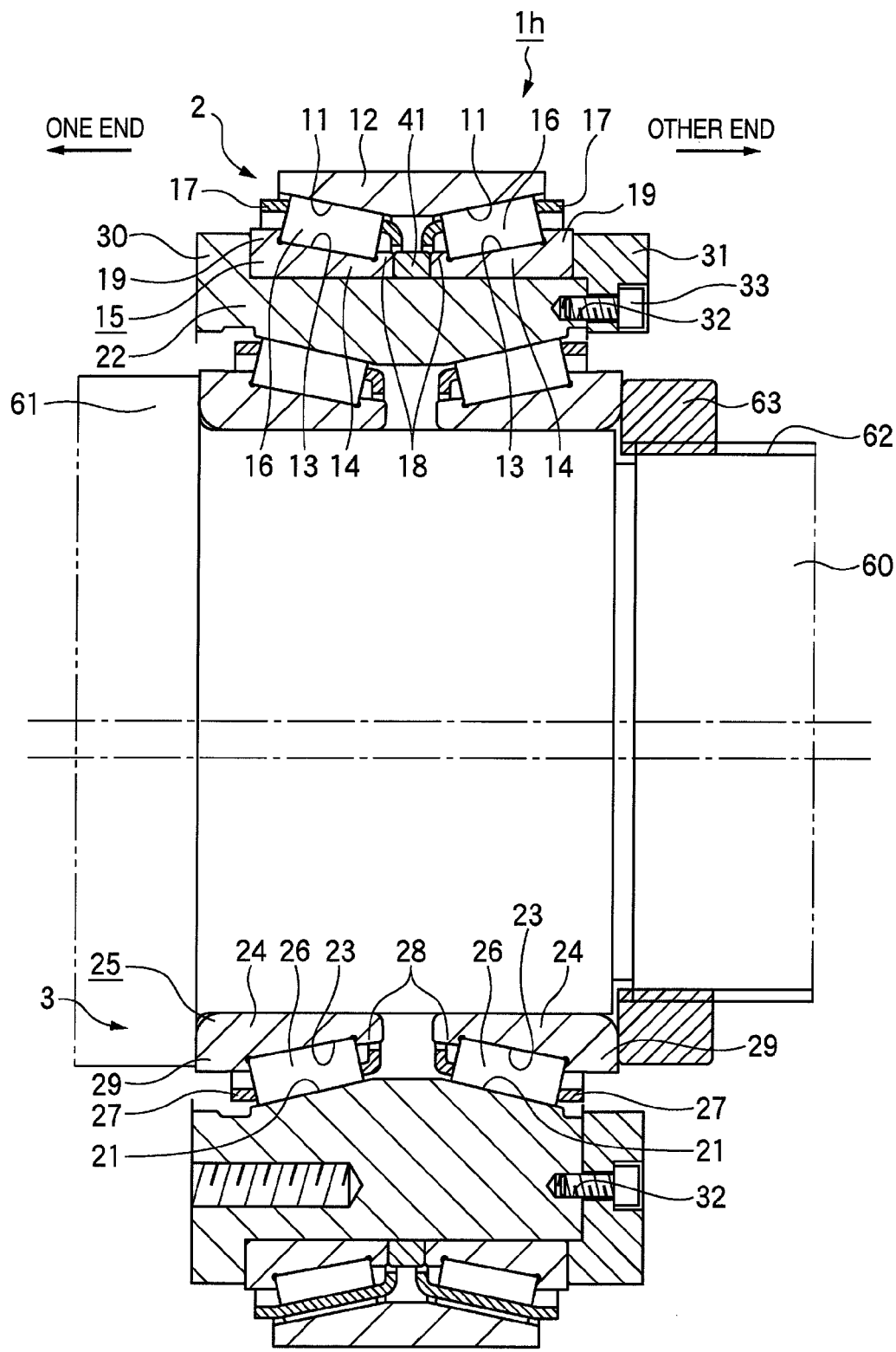
FIG. 9 is a sectional view of a double row tapered roller bearing unit in which an inner ring spacer of the third embodiment is applied to the fifth embodiment of the present invention.
Figure 10:
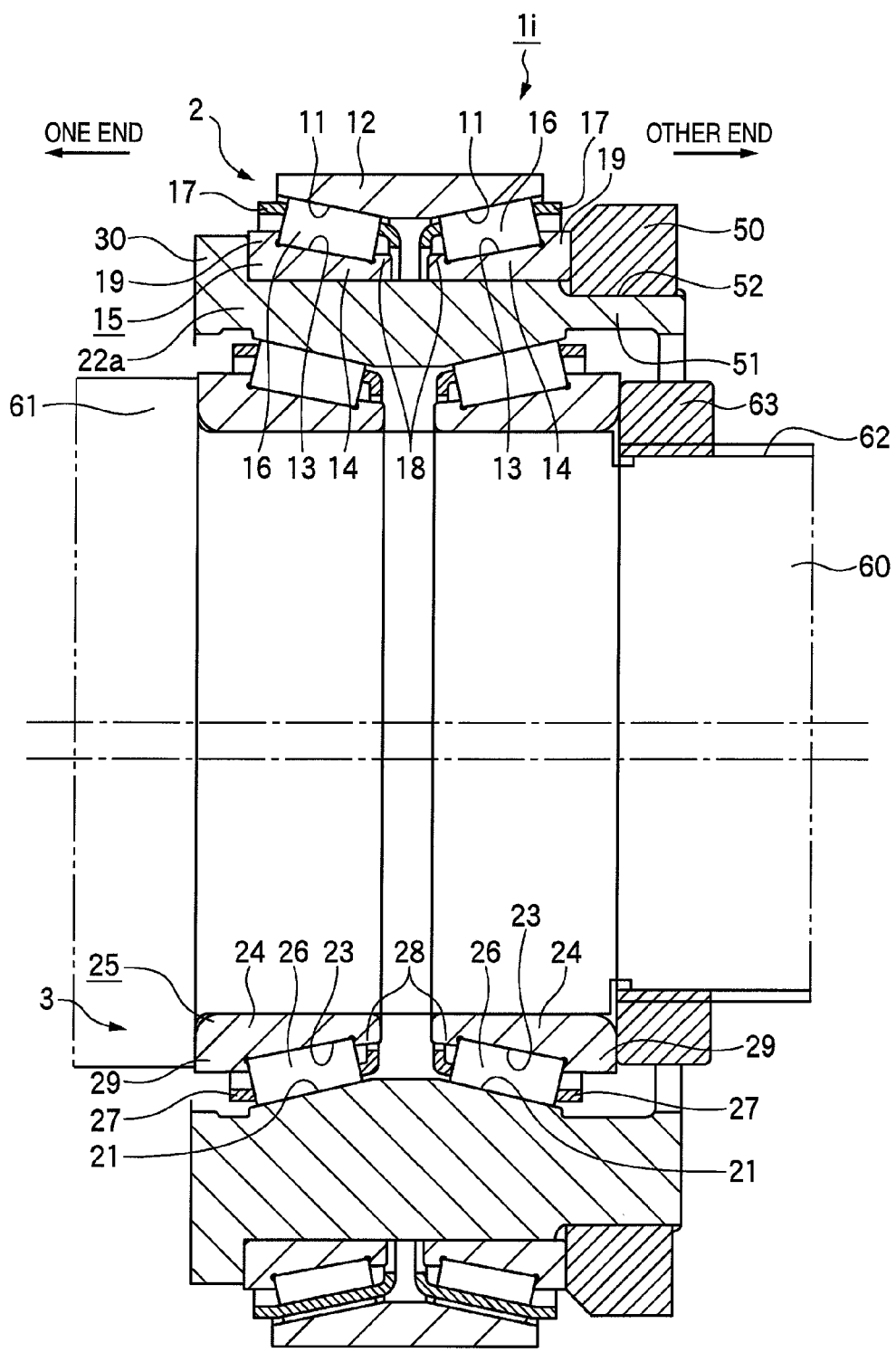
FIG. 10 is a sectional view of a double row tapered roller bearing unit in which a holding nut of the fourth embodiment is applied to the fifth embodiment of the present invention.
Figure 11:
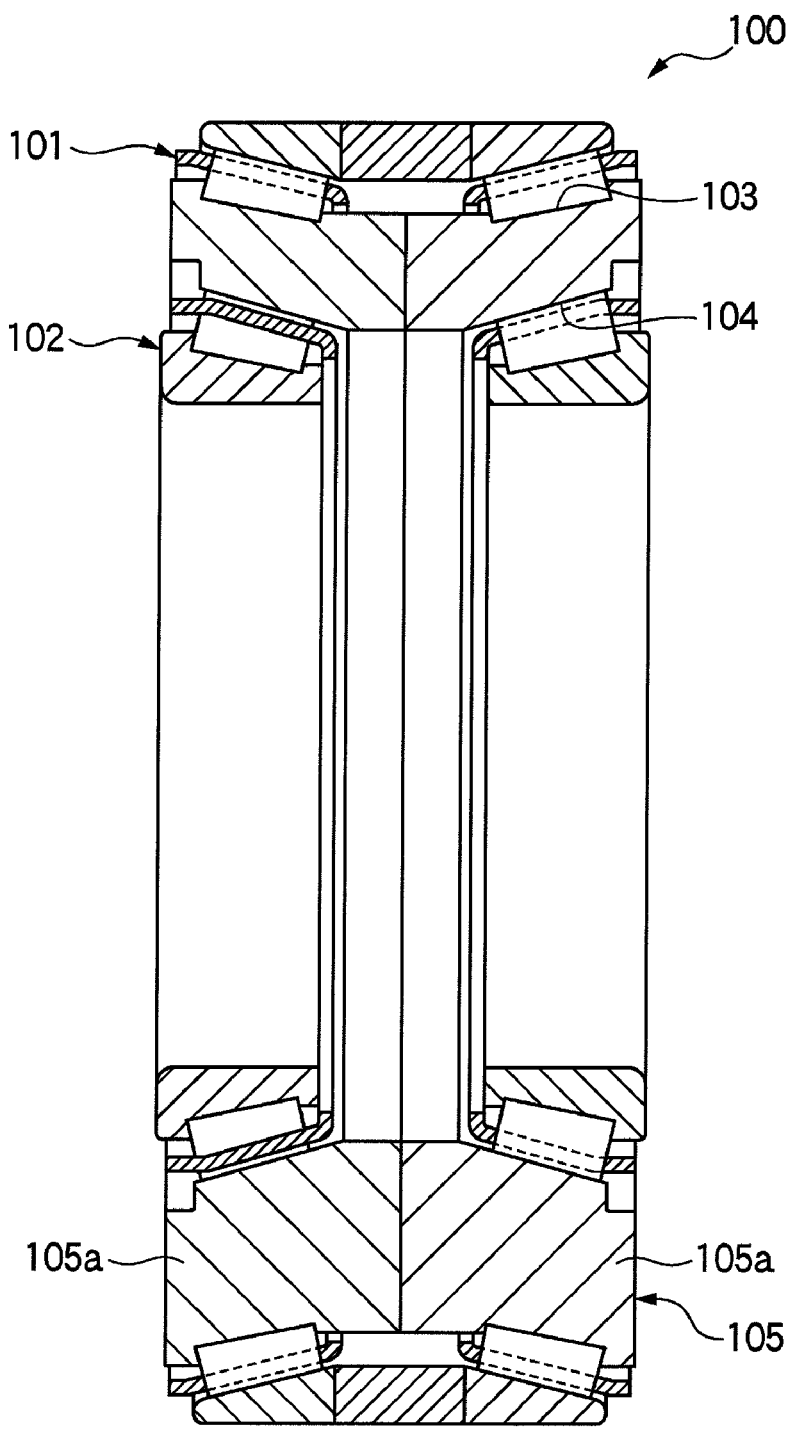
FIG. 11 is a sectional view of a conventional double row tapered roller bearing unit.
Figure 12:
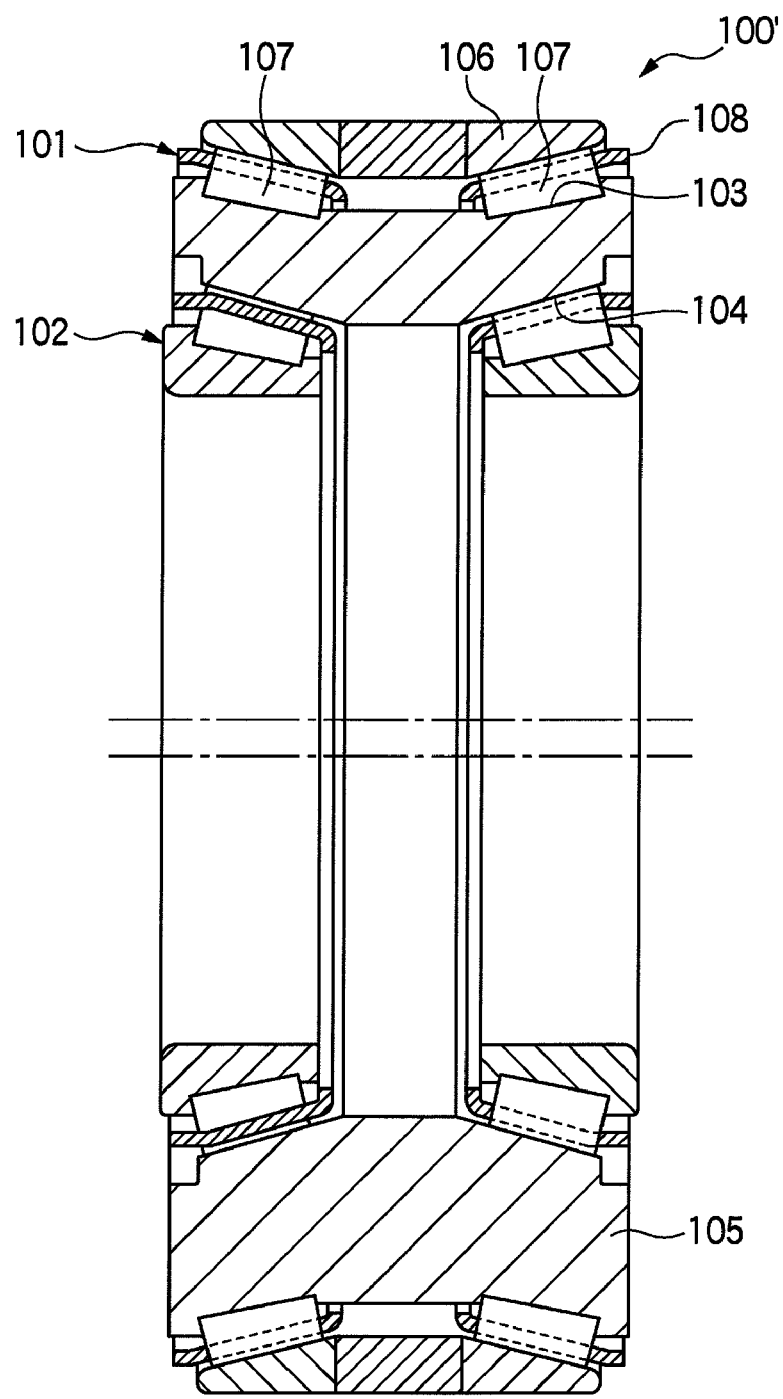
FIG. 12 is a sectional view of another conventional double row tapered roller bearing unit.
Figure 13:
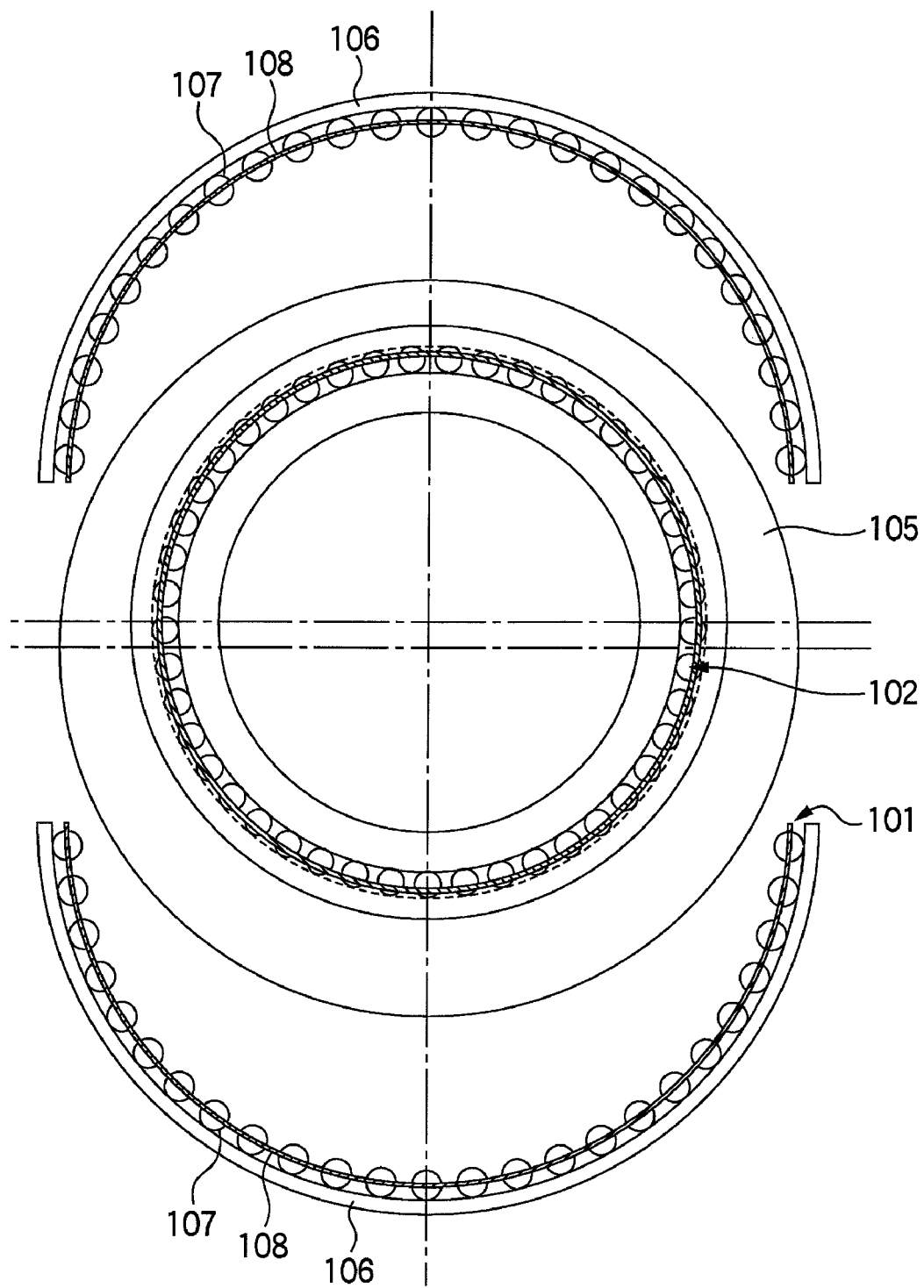
FIG. 13 is an exploded view of the double row tapered roller bearing unit of FIG. 12.

Because configurations and actions of other portions are the same as those of the fifth embodiment, portions that are equivalent are provided with the same symbol and redundant description shall be omitted The double row tapered roller bearing unit according to the present invention is not restricted to those according to the embodiments, and modifications, improvements, etc. can be made as suited, and the above-described embodiments can be applied in combination within an implementable range. For example, in a double row tapered roller bearing unit 1g shown in FIG. 8, the pair of holding rings 31 of the second embodiment are applied to the double row tapered roller bearing unit according to the fifth embodiment. In a double row tapered roller bearing unit 1h shown in FIG. 9, the inner ring spacer of the third embodiment is applied to the double row tapered roller bearing unit according to the fifth embodiment. In a double row tapered roller bearing unit 1i shown in FIG. 10, the holding nut 50 of the fourth embodiment is applied to the double row tapered roller bearing unit according to the fifth embodiment.

It suffices that the holding member of the present embodiment apply the preload to the respective tapered rollers 16, and besides the holding ring 31 and the holding nut 50, a retaining ring and a shim plate may be used with the retaining ring being latched to a latching groove at a portion at the other end side of the outer circumferential surface of the inner-side outer ring member 22 and the shim plate being disposed between the retaining ring and one of the inner ring elements 14.

Furthermore with the above-described embodiments, if the preload of the outer bearing 2 must be re-adjusted after mounting of any of the double row tapered roller bearing units 1 to 1i to the shaft portion 60, the adjustment can be performed by inserting a shim between the holding member (the holding ring 30 or the holding nut 50) and the outer-side inner ring element 14.

The present application is based on a Japanese Patent Application (Japanese Patent Application No. 2006-213500) filed with the Japan Patent Office on Aug. 4, 2006, a Japanese Patent Application (Japanese Patent Application No. 2006-276142) filed with the Japan Patent Office on Oct. 10, 2006, and a Japanese Patent Application (Japanese Patent Application No. 2007-016654) filed with the Japan Patent Office on Jan. 26, 2007, the contents of which are incorporated herein by reference.

What is claimed is:

1. A double row tapered roller bearing unit having a double structure comprising:
  an outer bearing comprising:
    an integral outer-side outer ring member, having formed on an inner circumferential surface thereof a double row of outer ring raceways each having a partially conical concave surface inclining in a direction such that an inner diameter increases toward an end in an axial direction;
    an outer-side inner ring member comprising a pair of outer-side inner ring elements each having an inner ring raceway of partially conical convex surface formed on an outer circumferential surface, and
    a plurality of tapered rollers, rollably disposed between both outer ring raceways and both inner ring raceways; and
  an inner bearing comprising:
    an eccentric integral inner-side outer ring member, having formed on an inner circumferential surface thereof a double row of other outer ring raceways each having a partially conical concave surface inclining in a direction such that an inner diameter increases toward an end in the axial direction,
    an inner-side inner ring member comprising a pair of inner-side inner ring elements each having another inner ring raceway of partially conical convex surface formed on an outer circumferential surface, and
    a plurality of tapered rollers, rollably disposed between both of the other outer ring raceways and both of the other inner ring raceways; and
  wherein the pair of outer-side inner ring elements are externally fitted onto the inner-side outer ring member in a state where respective ends of smaller outer diameter of both inner ring raceways oppose each other, and
  both outer-side inner ring elements apply preload to the respective tapered rollers by pressing forces acting from both sides in the axial direction by an outwardly-directed, flanged collar formed on an outer circumferential surface of one end among both ends in the axial direction of the inner-side outer ring member and by a holding ring fitted onto the other end of the inner-side outer ring member, or by a pair of holding rings fitted onto respective ends in the axial direction of the inner-side outer ring member, wherein each holding ring engages an end surface of a respective one of the outer-side inner ring elements and is urged against and fastened to the respective end of the inner-side outer ring member at an adjustable position in the axial direction by a fastener such that the outer-side inner ring elements are adjustably spaced along the outer circumferential surface of the inner-side outer ring member to adjust the preload.

2. The double row tapered roller bearing unit according to claim 1, wherein
the inner-side outer ring member is made of bearing steel and has a screw hole, for screw fixation of each holding ring formed in a respective end surface in an axial direction thereof, and
the inner-side outer ring member is formed by applying induction hardening to the other outer ring raceway and the outer circumferential surface or by applying immersion quenching and thereafter polishing the screw hole.

3. The double row tapered roller bearing unit according to claim 1, wherein
the inner-side outer ring member is made of carburized steel and has a screw hole, for screw fixation of each holding ring formed in a respective end surface in an axial direction thereof, and
an anti-carburization treatment is applied to the screw hole in the inner-side outer ring member.

4. The double row tapered roller bearing unit according to claim 1, wherein
the pair of inner-side inner ring elements are externally fitted onto a shaft portion in a state where respective ends of smaller outer diameter of both of the other inner ring raceways oppose each other, and
both inner-side inner ring elements apply preload to the respective tapered rollers of the inner bearing by pressing forces acting from both sides in the axial direction by another outwardly-directed, flanged collar formed on an outer circumferential surface of one end side in the axial direction of the shaft portion and by a nut member screwed onto the other end side of the shaft portion.

5. A double row tapered roller bearing unit having a double structure comprising:
an outer bearing comprising:
an integral outer-side outer ring member, having formed on an inner circumferential surface thereof a double row of outer ring raceways each having a partially conical concave surface inclining in a direction such that an inner diameter increases toward an end in an axial direction,
an outer-side inner ring member comprising a pair of outer-side inner ring elements each having an inner ring raceway of partially conical convex surface formed on an outer circumferential surface, and
a plurality of tapered rollers rollably disposed between both outer ring raceways and both inner ring raceways; and
an inner bearing comprising:
an eccentric integral inner-side outer ring member, having formed on an inner circumferential surface thereof a double row of other outer ring raceways, each having a partially conical concave surface inclining in a direction such that an inner diameter increases toward an end in an axial direction,
an inner-side inner ring member comprising a pair of inner-side inner ring elements each having another inner ring raceway of partially conical convex surface formed on an outer circumferential surface, and
a plurality of tapered rollers, rollably disposed between both of the other outer ring raceways and both of the other inner ring raceways; and
wherein the pair of outer-side inner ring elements are externally fitted onto the inner-side outer ring member in a state where respective ends of smaller outer diameter of both inner ring raceways oppose each other, the pair of inner-side inner ring elements are externally fitted to a shaft portion in a state where respective ends of smaller outer diameter of both of the other inner ring raceways oppose each other,
both outer-side inner ring elements apply preload to the respective tapered rollers of the outer bearing by pressing forces acting from both sides in the axial direction by an outwardly-directed, flanged collar formed on an outer circumferential surface of one end among both ends in the axial direction of the inner-side outer ring member and by a holding ring fitted onto the other end of the inner-side outer ring member, or by a pair of holding rings fitted onto respective ends in the axial direction of the inner-side outer ring member, wherein each holding ring engages an end surface of a respective one of the outer-side inner ring elements and is urged against and fastened to the respective end of the inner-side outer ring member at an adjustable position in the axial direction by a fastener such that the outer-side inner ring elements are adjustably spaced along the outer circumferential surface of the inner-side outer ring member to adjust the preload, and
both inner-side inner ring elements apply preload to the respective tapered rollers of the inner bearing by pressing forces acting from both sides in the axial direction by another outwardly-directed, flanged collar formed on an outer circumferential surface of one end side in the axial direction of the shaft portion and by a nut member screwed onto the other end side of the shaft portion.

* * * * *